United States Patent [19]

Williams

[11] Patent Number: 4,891,808
[45] Date of Patent: Jan. 2, 1990

[54] SELF-SYNCHRONIZING MULTIPLEXER

[75] Inventor: Arthur B. Williams, Smithtown, N.Y.

[73] Assignee: Coherent Communication Systems Corp., Hauppauge, N.Y.

[21] Appl. No.: 138,663

[22] Filed: Dec. 24, 1987

[51] Int. Cl.⁴ .............................................. H04J 3/04
[52] U.S. Cl. ................................... 370/112; 307/242; 328/104
[58] Field of Search ...................... 370/112, 113, 110.1, 370/111; 307/242, 243; 328/104, 105

[56] References Cited

U.S. PATENT DOCUMENTS

| | | |
|---|---|---|
| 3,636,524 | 1/1972 | Holland . |
| 3,729,590 | 4/1973 | Widl et al. . |
| 3,748,393 | 7/1973 | Baxter . |
| 3,840,705 | 10/1974 | Haskett et al. . |
| 3,873,776 | 3/1975 | Smith, Jr. et al. . |
| 3,909,540 | 3/1975 | Maryscuk et al. . |
| 3,936,609 | 2/1976 | Waldeck . |
| 3,970,799 | 7/1976 | Colton et al. . |
| 3,995,120 | 11/1976 | Pachynski, Jr. . |
| 4,132,862 | 1/1979 | Ferret et al. . |
| 4,243,930 | 1/1981 | DeCoursey . |
| 4,538,286 | 8/1985 | McNesby et al. ................... 375/112 |
| 4,744,082 | 5/1988 | Fujimura et al. ................... 370/112 |
| 4,759,018 | 7/1988 | Buchner ............................... 370/112 |
| 4,792,949 | 12/1988 | Virdee et al. ........................ 370/112 |

*Primary Examiner*—Herbert Goldstein
*Assistant Examiner*—Frank M. Scutch, III
*Attorney, Agent, or Firm*—Steele, Gould & Fried

[57] ABSTRACT

A time division multiplexer is operable to sample data on parallel input channels at a sampling rate at least twice the data rate, to serially transmit the data for each channel in a respective time division, and to recover the data at a receive end. The multiplexer is provided with a bit storage register for successive samples on at least one input channel to be used as a marker channel. Gating connected to the bit storage register forces a detectable unnatural data pattern on the transmitted data for that channel whenever a predetermined bit pattern is stored for that channel. According to one embodiment, when a plurality of unchanged levels (e.g., binary one) appear in the bit storage register, a central bit is inverted to thereby mark that channel. The inverted marker bit is detected and cancelled at the receive end and/or is used to reset the channel counter if detected on a channel other than the marker channel.

17 Claims, 3 Drawing Sheets

SELF-SYNCHRONIZING MULTIPLEXER

BACKGROUND OF THE INVENTION

1. Field of the Invention

This invention relates to the field of multiplexers operable in time divisions to transmit sampled data from a plurality of parallel input channels on a serial signal line, and to recover the parallel data from the serial signal line. More particularly, the invention relates to such a multiplexer and demultiplexer wherein means are provided to check the recovered data and to re-synchronize the channels such that the respective parallel inputs and outputs always correspond correctly. In the event of disturbance, the sequence of outputs is automatically corrected, without the need to employ framing or stop bits to precede or space frames of sampled data.

2. Prior Art

A variety of digital multiplexers are known wherein parallel input channels are sampled and the content of each sampled channel is placed in turn on a serial output during a time division corresponding to that channel. For example, a counter at the input end repetitively cycles through the channels in order. Gates responsive to the clock are operable for gating the signal on each channel through to the serial signal line during its respective time division. The data is recovered at a receive end by an apparatus operating in the reverse, that is by dividing the serial stream into the individual samples and routing the samples in turn to respective parallel output channels. One pass through all the channels is called a frame. Typically, extra transmitted bits or a time lapse are inserted to mark the start and/or stop of a frame.

According to some data transmission techniques, the clock used for de-multiplexing serial data can be derived directly from the data itself. Notwithstanding expected variations in data, over time a phase-locked loop control can derive the sampling clock from the sampled data. While systems of this type are reasonably effective at serializing the parallel data and converting the received serial transmission back into parallel channels, it sometimes happens that the proper order of channels becomes disturbed. Known time division multiplexers synchronize the input and output channels based on the framing or synchronization bits preceding or following the frame.

Additional framing procedures and codes such as inserted gaps, start/stop characters and the like, use time that could be employed for higher frequency sampling and better multiplexing effectiveness. The framing bits or characters are normally inserted and detected using additional circuitry that increases the expense of the multiplexer and reduces the efficiency of the overall device. The present invention avoids the need for extra time devoted to start/stop signalling. A synchronizing marker is added directly over the data for at least one given channel to be used as a marked or synchronizing channel. The marker is arranged as an "impossible" data pattern and during multiplexing the marker is inserted over a predetermined data pattern on the given channel. At the demultiplexing end the marker pattern is detected and the correct pattern replaced, provided the marker was found in the data for the given channel. Otherwise the sequence of channel demultiplexing is reset. This technique does not require that a gap be opened or that available time divisions be devoted to transmission of extra framing characters.

The invention takes advantage of the fact that the multiplexer samples incoming data streams at a rate substantially higher than the frequency at which digital levels change in the data. Where the sampling rate is higher than the rate of change of the data, a group of unchanged bits are transmitted during successive samples for a given input channel. According to the invention, when a predetermined succession of bits is detected during successive samples on a specific channel to be used as a marked channel, for example three unchanged ones in the binary stream, the middle bit is inverted. This impossible data pattern 1-0-1 becomes a marker for that channel. Should the inverted bit be detected in a channel other than the marked one, then the receiver section of the multiplexer/demultiplexer can be reset to re-synchronize the parallel inputs to the parallel outputs, whereupon correct operation resumes.

It is known in the art to insert supervisory signalling or framing bits in extra time slots made available therefor in a digital signal. Reference can be made, for example, to U.S. Pat. Nos. 3,936,609-Waldeck (inserts alarm bits); 3,748,393-Baxter (use extra bit spaces for signalling); 3,873,776-Smith, Jr. et al (insert alarm pulse). These patents use available time which could be used for data transmission, or require extra circuitry to detect when time is available, perhaps compressing the data, and then to insert signalling codes.

It is also known in the art to employ a particular code as a start or stop signal. In U.S. Pat. No. 4,243,930-DeCoursey, for example, three successive zero bits are used to define a time space between frames, for synchronizing the output and the input. Other examples along these lines can be found in U.S. Pat. Nos. 4,538,386-McNesby et al; 3,970,799-Colton et al, and in other disclosures. These also require that time be devoted to the start/stop codes. General purpose bit sampling multiplexers can be found, for example in U.S. Pat. Nos. 3,840,705-Haskett et al and 4,310,922-Lichtenberger.

In U.S. Pat. No. 3,995,120-Pachynski, Jr., the idea is disclosed that where the sampling rate is much higher than the average rate of data change, it is possible to compress the data and thereby open up additional time for signalling. Where the data rate is slower than the sampling rate, Pachynski bunches together samples, leaving a time space before and after the frame of active data channels, for use as signalling and/or framing bits.

Each of the foregoing prior art disclosures has means to accomplish multiplexing and means to retain the proper order of the channels when demultiplexing. However, all do so in ways that require substantial additional circuitry and/or take up time for framing or synchronizing signals. The present invention on the other hand puts a signalling bit directly into the data, the data being represented by a plurality of samples at the higher sampling rate. The signalling bits need not use up time divisions and need not appear during every transmitted frame. Each time the predetermined pattern (e.g., a string of unchanged high levels) appears in the successive samples for the marking one of the parallel inputs, a central bit is inverted and used as a marker for this one channel. Preferably, the mark channel is the channel transmitted at the beginning of a frame of sampled channels. Accordingly, whenever the marker bit is detected, the counter or the like that advances the demultiplexer through the respective channels when converting the data from serial to parallel can be simply reset.

The invention is advantageously embodied as a two channel multiplexer. In this event, the means cycling through the input channels (i.e., the two parallel inputs) can be as simple as a flip flop. In a device in which a large number of channels are used, a counter and a one-of-n decoder can provide sequencing to gate through samples of the parallel inputs to the serial bit stream. Preferably, additional flip flops defining an input shift register are provided such that the successive samples for a particular channel, i.e. the synchronizing channel, are stored and compared to a predetermined pattern arranged for insertion of a marker bit. The invention accomplishes synchronization automatically and with minimum of overhead and complexity.

BRIEF DESCRIPTION OF THE DRAWINGS

There are shown in the drawings examples of embodiments of the invention as presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
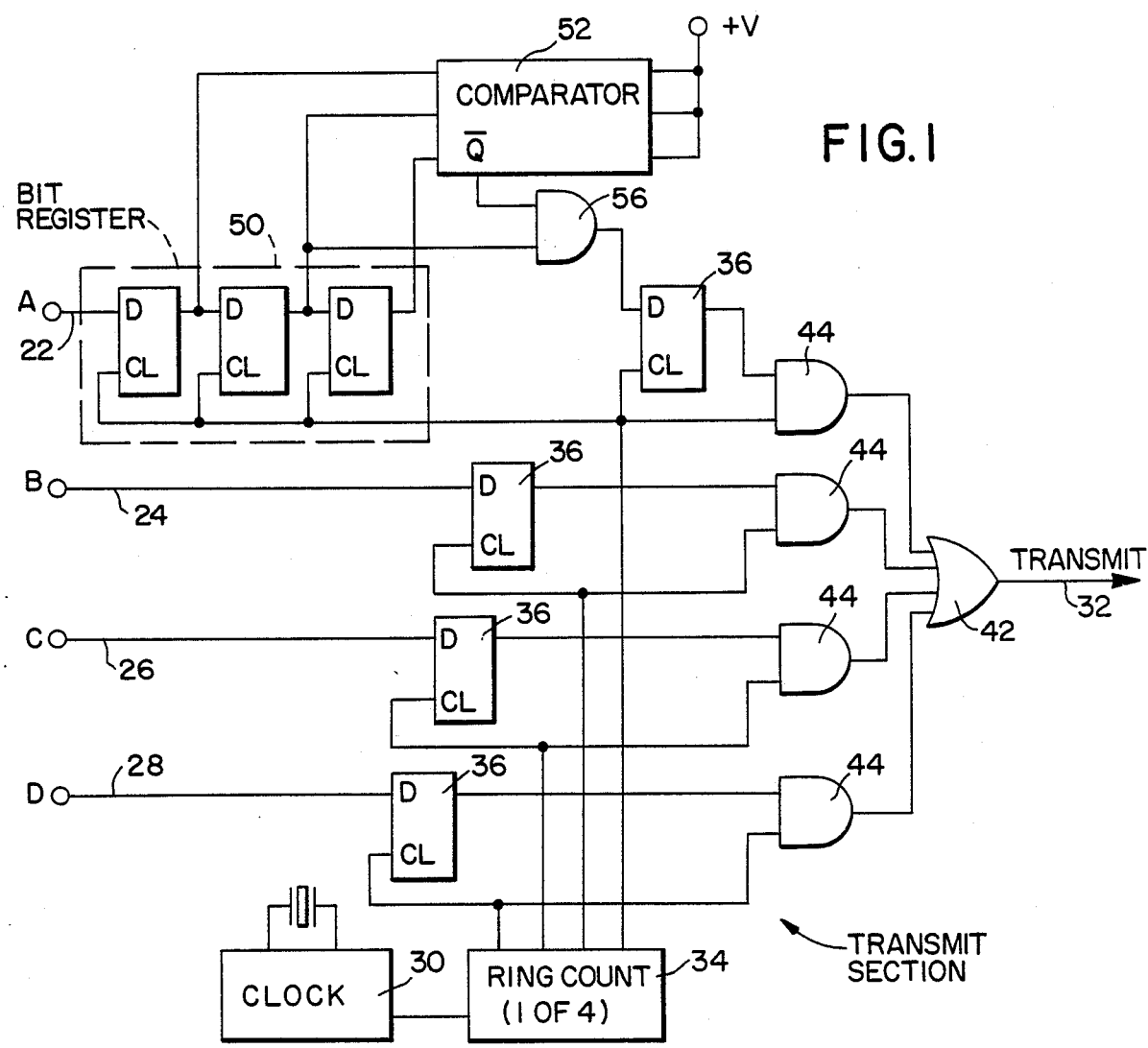
FIG. 1 is a schematic illustration of a transmitting (multiplexing) section of a multiplexer/demultiplexer according to the invention.

A general schematic illustration of the invention is shown in FIG. 1. Digital input signals from a plurality of parallel inputs 22, 24, 26, 28, labelled A through D, are to be serialized in time divisions and output on single transmit line 32. As is typical of multiplexers generally, the signal on each input line 22, 24, 26, 28 is sampled in turn and via gating the signal at the time of sampling occupies a time division in the serial output signal on transmit line 32. A clock oscillator 30, which may or may not be synchronous with the signals on the input channels, drives ring counter 34, having a plurality of outputs, only one of which outputs is active at any moment. Counter 34 may be connected to a one-of-four decoder, or the counter and decoder can be replaced by a shift register in which a single logical-true bit is shifted through a plurality of flip flops such that the output lines leading to the clock inputs of channel flip flops 36 and to multiplexer channel gates 44 are active one at a time, during their respective time divisions. When a given channel is selected, its value is loaded into flip flop 36 on that channel, the output of which is likewise gated through via gate 44. An output OR gate 42 then combines the sequentially sampled outputs of multiplexer channel gates 44 into a single serial output signal, labelled "transmit" in FIG. 1.

The device of the invention, like a typical multiplexer, interleaves parallel binary channel data for transmission as a serial stream which later is separated again into parallel binary channels. Unlike typical multiplexers, however, the invention also characteristically marks data passing through at least one of the input channels 22, 24, 26, 28 (i.e, channel 22 in the embodiment illustrated in FIG. 1), such that a demultiplexing device at the receive end can always correctly route the serial data to the correct channels, without insertion of start/stop bits, spaces or other characters that would occupy time periods during the time otherwise available for time divisions devoted to data.

The device of the invention is especially suited for multiplexing together independent lower speed asynchronous data channels by over sampling them at a higher synchronous speed. The device is relatively uncomplicated to implement, particularly where the number of channels is small. In an embodiment for two channels, the invention can be very economically realized.

According to the invention, it is recognized that due to the higher speed sampling of the asynchronous data channels, certain characteristic data patterns will not occur during proper operation of the multiplexer. Specifically, in such an over sampling technique, a change of state substantially shorter than the period of the maximum rate of change of the asynchronous data will not occur on any of the sample data channels. This fact is true provided the digital data has reasonably clean bounce-free pulses, for example as typical of digital circuits and not typical of switch closure outputs. Inasmuch as the asynchronous data has a maximum rate of change that still is much slower than the sampling rate, it can be expected that a plurality of identical samples will occur on either side of any transition in the data. Accordingly, without creating any additional jitter or distortion and without substantial additional overhead, the present invention proposes to mark one or more of the input channels by transmitting an unnatural data pattern, for example a pattern characteristic of a data rate much higher than expected, which is detected and corrected at the receiving end provided the channels are sequencing correctly. In the illustrated example, three consecutive mark (logical one) samples of a particular oversampled input channel are detected at the transmit end and the middle sample is inverted to space (logical zero). The 1-0-1 pattern cannot occur in correctly sampled data because it implies a rate of change of data equal to or greater than the sampling rate, which is expected to be much higher than the asynchronous data rate. Therefore, this marking signal can be dependably detected and corrected at the receive end.

According to the invention as illustrated in FIG. 1, at least one of the input channels 22 is provided with a bit register 50, which stores a plurality of sequential samples for that one channel. Whenever the channel select output of ring counter 34 leading to channel 22 is activated, the instantaneous logical value at channel 22 is sampled (i.e., the high or low level is loaded into the initial flip flop in the bit register), and the previous samples are shifted one space towards the transmit output. The bit register is a simple shift register made of serial D-flip flops clocked when the channel is sampled. The Q outputs (i.e., the high true outputs) of the D-flip flops are connected as inputs to a digital comparator 52. Comparator 52 compares the bit pattern on the A channel stored in bit register 52, to a predetermined value, for example 1-1-1. When the predetermined pattern (e.g., three consecutive mark samples) is detected, the low-true output of comparator 52, which would normally allow data from the A register to pass through the multiplexer channel-select gates 44 and thereafter to output OR gate 42, forces flip flop 36 to be loaded with a zero. Accordingly, whenever there are three consecutive mark samples on channel A, the middle mark is inverted to space.

Comparator 52 is illustrated generally in FIG. 1 as a digital comparator comparing the contents of bit register 50 to a pattern of 1-1-1, the other inputs to the comparator being connected to logical 1. It will be appreciated that in the illustrated example, the comparison to all ones is equivalent to operation of a NAND gate having three inputs connected respectively to the outputs of the D-flip flops in bit register 50. Accordingly, provided the selected data pattern is 1-1-1, the comparator can be replaced by a three input NAND gate.

Figure 2:
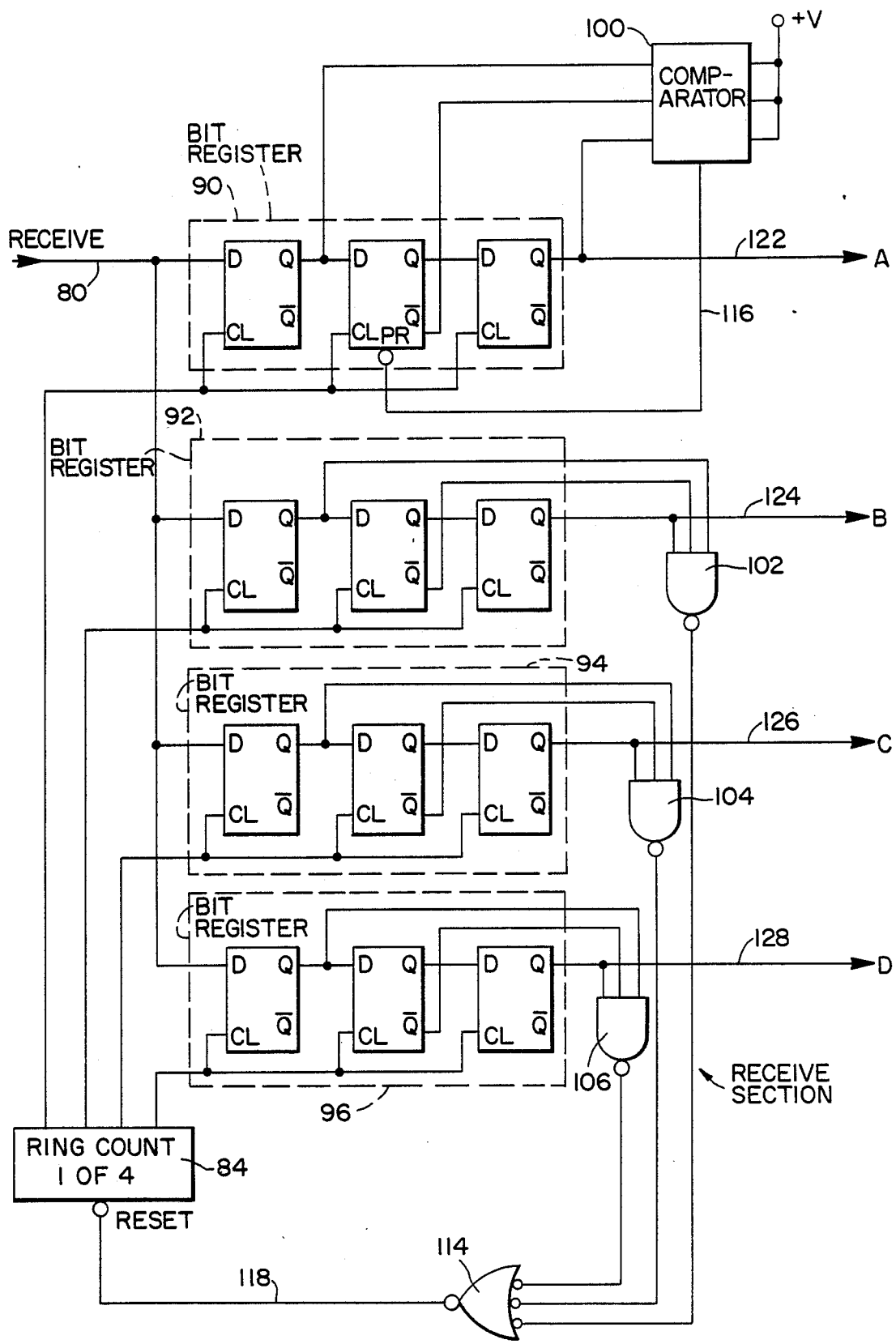
FIG. 2 is a schematic illustration of a receiving (demultiplexing) section according to the invention, operative together with the transmitting section of FIG. 1.

Downstream of the transmit section along the signal path as shown in FIG. 1, the signals on input channels A, B, and C and D occupy time divisions on the transmit output 32. However, the middle one of any three consecutive mark samples on channel A is transmitted as a space. FIG. 2 shows a generalized receive section operable with the transmit section of FIG. 1. On the receive side of the multiplexer, the data received during each successive time division on the serial input line 80 is to be routed to a next one of the output channels A, B, C and D, which are connected as parallel outputs 122, 124, 126, 128. In a manner similar to the transmit section, a ring counter 84 having one output true at any one time, loads the signal from serial receive input 80 into a respective one of the receive section input D-flip flops which comprise the inputs to bit registers 90, 92, 94, 96 on each of the channels A through D, respectively. When the ring counter activates a given output, connected as the clock input to one of the receive input section D-flip flops, the signal on serial receive line 80 at that moment is simply loaded into that flip flop. Ring counter 84 can be driven from a clock signal derived from the data on receive line 80, for example by a phase-locked loop clock generator 329.

Each of the receive section channels A through D has a bit register and a digital comparator. The bit register stores three consecutive samples and in each case the forced, unnatural bit pattern (e.g., 101) is detected in the bit register by any of the channels. The properly marked channel (channel A in the disclosed embodiment) is expected to have this marker bit set while the other channels are not. Accordingly, when the channel A detector has a 1-0-1 marked pattern, the middle bit is simply inverted at the receive section and the output is shifted onto parallel output 122. However, should one of the other channels detect this unnatural marking code 1-0-1, then the device is not sequencing the channels correctly because only the predetermined channel has been marked. The output of any of the digital comparators detecting the marker pattern other than the marked channel A, is routed through an OR gate 114 to reset ring counter 84. In this manner, the multiplexer is always self synchronizing and will return to proper synchronization every time a marked bit is detected, which may occur repeatedly during sampling.

The bit register in the receive section as illustrated in FIG. 2 is similar to the bit register in the transmit section. However, the outputs of the bit register in the receive section are connected such that the inverted output of the middle shift register is used. Accordingly, the comparator again can be embodied as a NAND gate, with the result that the ring counter 84 will be reset whenever the 1-0-1 pattern appears on the bit register Q output.

The invention can be applied to any number of channels but is especially effective and easy to implement in a two channel multiplexer. In this case, the transmit and receive sections can be embodied in a minimum number of logic components, as shown in FIGS. 3 and 4.

Figure 3:
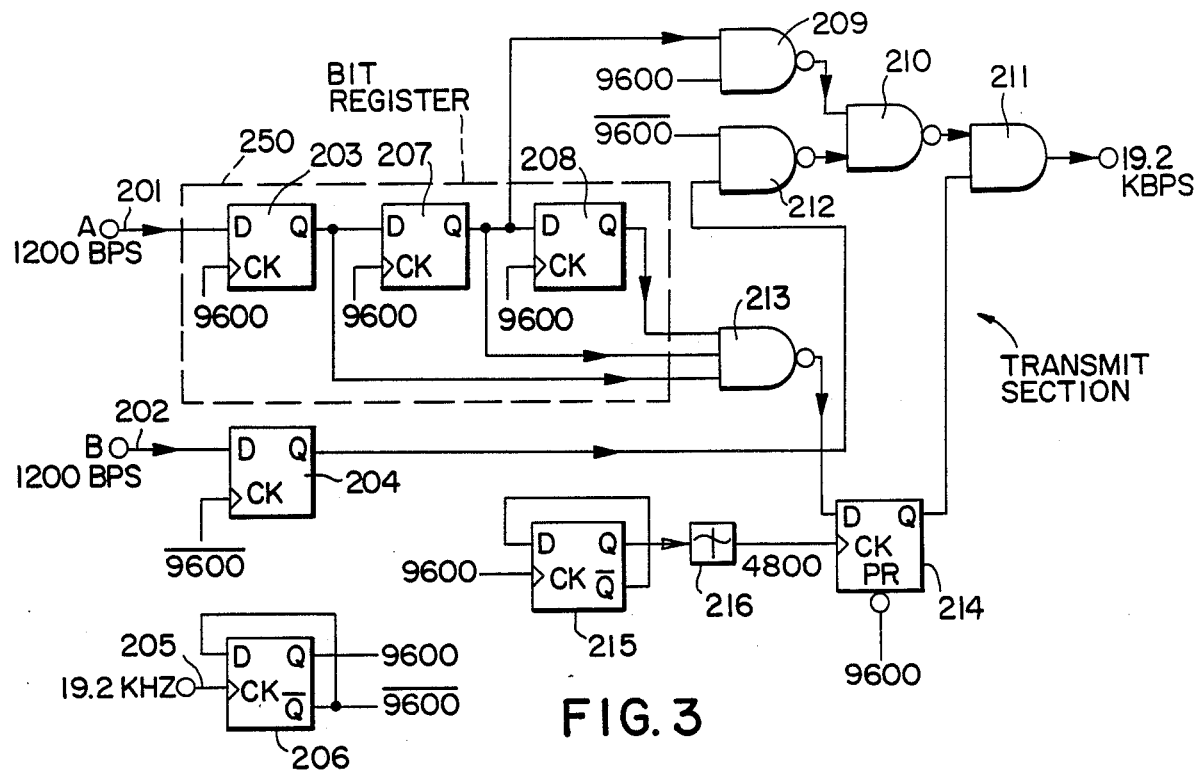
FIG. 3 is a schematic diagram of a practical embodiment of a transmit section according to the invention, for a dual channel multiplexer.
Figure 4:
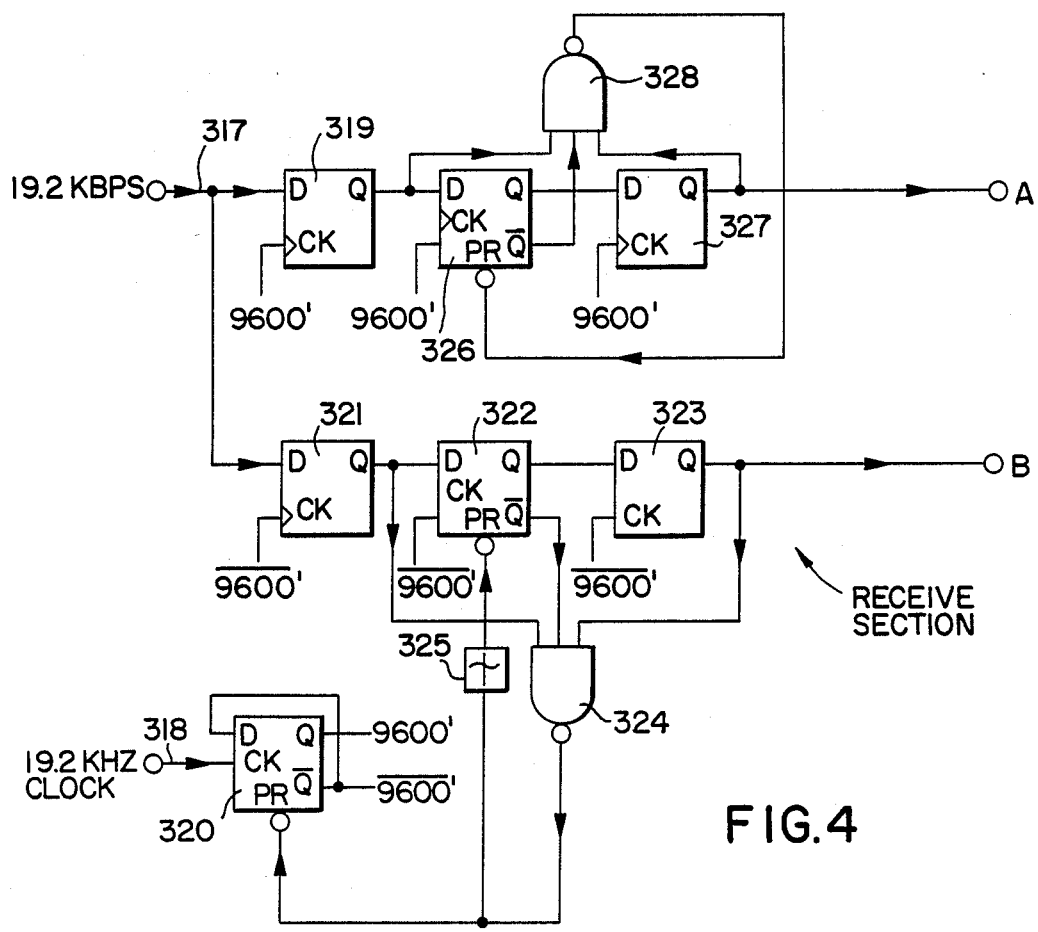
FIG. 4 is a practical embodiment of a dual channel multiplexer receive section, operable with the embodiment of FIG. 3.

FIG. 3 shows a logic diagram of an implementation of the transmit section in two channels. The two input channels A and B, on inputs 201, 202, both for example at 1200 bits per second (BPS), and asynchronous with one another, are oversampled and combined into a serial output at 19.2K BPS. These examples are meant to be illustrative, and other data rates and situations are also possible.

The instantaneous levels on input 201 for channel A and input 202 for channel B, are loaded respectively into flip flops 203 and 204 at alternate times by using different edges of the transmit clock signal. Flip flops 203 and 204 can be positive edge triggered D-flip flops, and can be clocked, for example, by dividing by two the incoming 19.2 KHz transmit clock signal 205 using flip flop 206, which is connected to toggle every time a transition occurs on its input clock line. Since the clock signals for positive edge triggered flip flops 203 and 204 are complementary, the asynchronous input channels 201 and 202 are sampled alternately.

The alternate sampling of the asynchronous input channels will necessarily result in a certain ambiguity or distortion because transitions on inputs 201, 202 must await their positive clock edges before appearing in the output. This distortion is also known as jitter. The general formula for distortion of such a circuit is:

$$\% \text{ Distortion} = \frac{\text{Channel Data Rate } (BPS)}{\text{Sampling Rate (Hz)}} \times 100$$

Applying the general formula to the present situation, an ambiguity or distortion of 12.5% is expected ($1/9600 \div 1/1200 = 1200/9600 = 12.5\%$).

The illustrated circuit will insert a space between the first and last marks of any three consecutive marks on channel A. Channel B data is simply clocked through the system during its proper time divisions.

Flip flops 203, 207 and 208 form a bit register 250. The flip flops of the shift register are also driven by the 9,600 Hz clock, such that each bit is delayed by one clock period as compared to the B channel. Therefore, the Q outputs of flip flops 207, 203 and 208 represent a given sample of channel A, the next subsequent sample and the next previous sample, respectively. When the 9,600 signal is high, the output of flip flop 207 is gated through NAND gates 209 and 210 and becomes one of the inputs of AND gate 211. At this point, if the data sample was a mark, the logic level at the input to gate 211 would be logic one.

When 9,600 is low (i.e., when 9,600 or "not $\overline{9,600}$" is high), the channel B output sample of flip flop 204 is gated through NAND gates 212 and 210, and becomes the input of AND gate 211, i.e., the same input formerly carrying the channel A data. Assuming that the other input to gate 211 is a logic one as a result of a prior preset of flip flop 214, the channel B sample appears at the output 211 and is transmitted along the serial line.

Three input NAND gate 213 is responsive to the instantaneous channel A data sample (i.e., the output of flip flop 207, which is also an input to NAND gate 209)

as well as the subsequent and previous samples, on flip flops 203 and 208. If all three of the samples are at mark (logic one), the output of NAND gate 13 is low and will reset the flip flop 214 at the next occurrence of the 4,800 signal.

Flip flop 215 operates in the toggle mode and divides out the 4,800 (i.e., 4,800 Hz) signal from the 9,600 signal. A time delay block 216 provides a slight propagation delay to ensure stabilization of the D input to flip flop 214 prior to the positive clock transition. The propagation delay can be provided, for example, by a pair of serially-connected inverters or the like. For every alternate sample of the channel A input according to the invention, the output of three input NAND gate 213 is clocked into flip flop 214 by the output of flip flop 215. If the output of NAND gate 213 is low (indicating that all three samples at the output of shift registers 203, 207 and 208 are at mark (logic one)), the output of flip flop 214 goes low thus over-riding the mark gated through NAND gates 209 and 210 and forcing a space (logic zero) at the output of AND gate 211.

When the 9,600 signal goes low, flip flop 214 is preset, forcing a logic one at its output and eliminating the forced output space. The output of the transmit section then reflects the B channel data, appearing at the Q output of flip flop 204.

As a result of the foregoing circuits, the multiplexer transmitting section alternately samples input channels A and B and interleaves the samples in time divisions at the output. However, for every alternate sample, a logical zero or space is forced for the A channel sample, provided that the specific sample was a mark (logical one) and that the preceding and subsequent A channel samples were also marks. Since the sampling rate is normally much higher than the data rate (in this case 9,600 Hz versus 1,200 BPS), the space forced to occur during the mark interval is only approximately an eighth of a data bit in duration. Thus, the marker is a unique occurrence that cannot occur in the incoming channel A data stream, which is presumed to be clean edged.

The output stream of the transmit section consists of alternate sampled bits for both the high and low states of the sampling clock 9,600. Therefore, the actual output bit rate is twice that clock rate (i.e., 19.2K BPS in the illustrated embodiment) because two bits are transmitted per clock period.

The corresponding receive section for the multiplexer is shown in FIG. 4. In this case, the receive data arriving at 19.2K BPS on serial input line 317 is to be directed bit by bit alternately into the A and B channels, whereupon the data will again pass into parallel asynchronous data channels, as close as possible to the data which was initially at the input to the transmit section. As shown in FIG. 4, the 19.2K BPS receive data signal on line 317 and its associated clock 318, are applied to flip flops 319 and 320 respectively. The positive edge of the receive clock 318 occurs during the center of the receive data bit 317. As in the transmit section, the serially-connected flip flops 319, 326, 327, clocked by the 9,600 signal, and flip flops 321, 322, 323 clocked by the inverted version of the 9,600 signal, are shift registers that store three successive samples of data on each of the A and B channels.

Flip flop 320 operates in the toggle mode and generates the 9,600 and the inverted 9,600 clocks. Flip flops 319 and 321 sample the receive data at the positive edges of their respective clocks, which are directly out of phase. Therefore, adjacent data bits on the 19.2K BPS receive data line are alternately sampled by flip flops 319 and 321, thus separating the serial data into two data streams and reversing the interleaving process that occurred in the transmit section. Flip flops 321, 322, 323 and 319, 326, 327, each forming a three stage shift register, will simply advance the data along bit by bit with the occurrence of clock transitions. However, there is an ambiguity because during initiation of the device and/or following any disturbance that interferes with correct routing of the bits, there is nothing to ensure that the sequence is such that the next bit loaded into flip flop 319 is intended for channel A rather than channel B, or vice versa.

The invention immediately corrects this ambiguity whenever it occurs. If the original channel A data stream during initiation (or other malfunction) is presented on the intended channel B path, then three input NAND gate 324 will detect the occurrence of a space sample bit preceded and followed by a mark sample (i.e., 1-0-1), namely the impossible pattern which is used to characteristically mark the A channel. The output of NAND gate 324 will then momentarily go low, thus changing the state of the output of toggle flip flop 320 and in effect resetting flip flop 320 to refer this data to the A channel rather than the B channel and therefore automatically re-synchronizing the receive section. After a slight propagation delay, effected for example by delay means 325, flip flop 322 is preset, thus forcing the output of three input NAND gate 324 back to logic one. The channel B data stream then correctly appears at the output of flip flop 323 and demultiplexing proceeds correctly.

It will be appreciated that according to the foregoing description, flip flop 320 acts as a two state counter, which is reset upon detection of a marked data progression occurring in the B channel. Similarly, flip flops 319, 326 and 327 form a three stage shift register in the channel A path. When a space sample is detected in the channel A path, preceded and followed by mark samples, the output of three input NAND gate 328 momentarily goes low, forcing a mark at the output of flip flop 326 and thus clearing the artificially-generated space sample inserted by the transmit section and restoring the output of NAND gate 328 to logic one. In this case it is not necessary to adjust the sequence because the marked data has occurred as expected in the A channel. Accordingly, the A channel simply corrects (unmarks) the data by eliminating the forced space.

Figure 5:
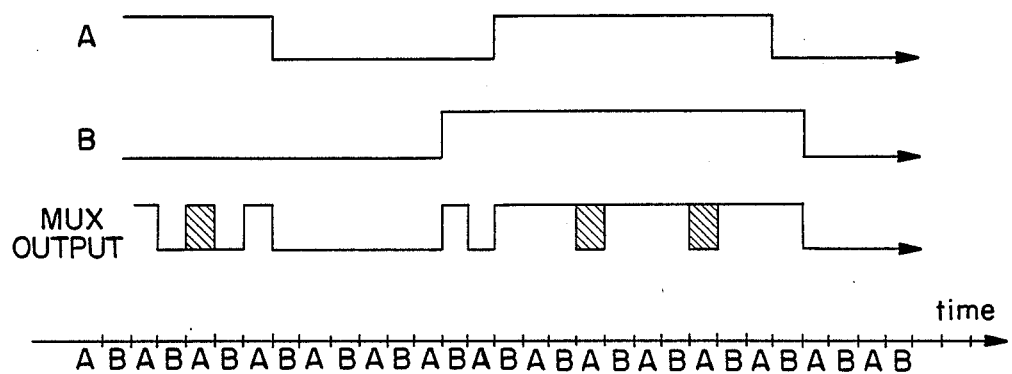
FIG. 5 is a timing diagram showing the insertion of timing marker bits in accordance with the embodiment of FIGS. 3 and 4.

FIG. 5 illustrates a characteristic timing diagram for the transmit and receive sections according to the invention. The A and B channels are asynchronous and have a characteristic rate of change substantially slower than the sampling rate, which sampling rate is shown by the scale marks on the time scale. As a result of sampling, the MUX signal is developed. At each occurrence of three consecutive marks in the A channel, as shown in the hatched pulses on the MUX signal, a marker bit is available and can be inverted without adding uncertainty, as a means to ensure the correct synchronization or channel order of demultiplexing.

The invention can be embodied using any number of channels, provided the sampling rate is sufficiently higher than the characteristic rate of change of data that at least three unchanged samples can be expected to occur in the sample data during a single data bit. The same procedure also can be used, for example with a larger number of unchanged samples in the event that the sampling rate exceeds the data rate by a larger ratio. A number of other possibilities and variations will now occur to persons skilled in the art made aware of this disclosure. Reference should be made to the appended claims rather than the foregoing specification as indicating the true scope of the invention.

What is claimed is:

1. A multiplexer for transmitting time-varying signals from a plurality of parallel inputs over a serial path to a plurality of corresponding outputs, comprising:

means operable repetitively to sample a signal on each of the inputs in turn, at a sampling rate higher than an expected rate of change of the signals on the inputs, thereby defining sample bits, and to place levels corresponding to the sample bits for respective individual ones of the inputs onto the serial path in turn;

a marker operable to sense successive sample bits for at least a certain one of the plurality of inputs and to detect in the successive sample bits a predetermined pattern occurring therein during normal operation, the certain one of the inputs corresponding to a certain one of the outputs, the marker being operable to impose a variation in the levels for the certain one of the inputs, which variation identifies levels intended for said certain one of the outputs;

a receiver operable to receive the successive levels on the serial path and to set each of the outputs, in turn, equal to the sample bit for each of the inputs, in turn; and, a sequencing means associated with the receiver, the sequencing means detecting the variation marking said certain one of the inputs and routing the corresponding output to said certain one of the outputs; whereby the multiplexer synchronizes the certain one of the inputs to the certain one of the outputs every time the predetermined pattern appears on the certain one of the inputs.

2. The multiplexer of claim 1, wherein the inputs and the outputs are digital levels having a data rate and the sampling rate is substantially faster than the data rate, the variation imposed by the marker being a change of state imposed at said faster sampling rate, whereby the variation is distinguishable from a change in transmitted data.

3. The multiplexer of claim 2, wherein the inputs are synchronous digital signals at approximately equal bit rates and the sampling rate has a frequency greater than twice said bit rate.

4. The multiplexer of claim 2, wherein the predetermined pattern is a succession of unchanged sampled levels for the certain one of the inputs.

5. The multiplexer of claim 4, wherein the variation is a change of state imposed in the transmitted signal during one of the sample bits of the certain input.

6. The multiplexer of claim 5, wherein the inputs vary in time between mark and space and wherein a space is imposed in a middle one of three sampled mark bits in said certain one of the inputs.

7. A multiplexer, comprising:

a transmitting section having a plurality of input channels and a serial output, the input channels being sampled repetitively in sequence and sampled levels on the input channels occupying time divisions in the serial output, the serial output of the transmitting section being transmitted to become a serial input to a receiving section;

the receiving section having a plurality of parallel outputs and the receiving section being operable to subdivide out signals on the serial input according to time divisions and to set successive ones of the parallel outputs to an instantaneous level of the serial input during successive ones of the time divisions;

the transmitting section having means for storing levels for at least one of the parallel inputs taken during a plurality of successive samples of at least one channel corresponding to said at least one of the parallel inputs, and a comparator means connected to the means for storing levels, the comparator means being operable to detect a predetermined pattern in the levels for a plurality of successive samples of said at least one channel and to impose a change of state in the serial output of the transmitting section during a time division for said at least one channel, whereby data passing through said at least one channel is marked;

the receiving section having means for storing levels for a plurality of successive time divisions applicable to at least one output channel corresponding to said at least one channel, and gating means operable to detect and cancel the change of state in the at least one output channel, the receiving section being operable to re-synchronize to a different output channel when the change of state is detected for a channel other than said at least one channel, whereby the multiplexer is self-synchronizing.

8. The multiplexer of claim 7, wherein the predetermined pattern is a succession of unchanged samples on said at least one channel and the change of state is a reversal of a single one of said samples within the succession of unchanged samples.

9. The multiplexer of claim 8, wherein the channels are set to digital levels, the predetermined pattern being three consecutive unchanged levels, the change of state being a changed level for a middle one of the three consecutive unchanged levels.

10. The multiplexer of claim 7, wherein only an initial channel in a plurality of multiplexed channels is marked and wherein the receiver is reset to the initial channel upon detection of the change of state.

11. A digital multiplexer, comprising a transmitter section having:

means defining a plurality of parallel input channels adapted for digital data transmission at characteristic data rates and a serial output;

a sample rate clock and a time division counter repetitively defining time divisions for each of the parallel input channels, the sample rate clock being faster than the characteristic data rates;

time division gating means connected to each parallel input channel, the time division gating means being responsive to the outputs of the time division counter and operable, at a rate defined by the sample rate clock, to pass data during each of said time divisions onto a corresponding one of the parallel input channels to the serial output;

at least one input bit storage register connected to at least one synchronizing channel of the parallel input channels, the input bit storage register being operable to store bit samples for a plurality of successive samples of the synchronizing channel; and, marker gating means connected to outputs of the bit storage register, the marker gating means being operable to detect a predetermined bit pattern and to invert a marker bit in the predetermined bit pattern for said synchronizing channel, whereby data passing through that channel is marked.

12. The digital multiplexer of claim 11, further comprising a receiver section, the receiver section having:
a serial input in data communication with said serial output and a plurality of parallel output channels;
a receiver sample clock, and a receiver time division counter operable at a rate defined by the receiver sample clock, the receiver time division counter defining time divisions for the receiver section;
gating means connected to the serial input, the parallel outputs and the counter, the gating means being connected such that data on the serial input during individual time divisions is passed in turn to successive ones of each of the parallel outputs, each of the parallel outputs having an output bit storage register through which successive sampled levels for said parallel outputs are shifted;
at least one of the output bit storage registers corresponding to the synchronizing channel having means operable to detect and re-invert said marker bit, the marker bit appearing on the synchronizing channel when the receiver section is synchronized with the transmitter section, at least one remaining output bit storage register having control means operable to detect the marker bit, the marker bit appearing in said remaining bit storage register when the receiver section is not synchronized with the transmitter section, the control means being operable to reset the receiver time division counter when the marker bit is detected in said remaining bit storage register, whereby the receiver section is automatically re-synchronized with the transmitter section.

13. The multiplexer of claim 12, wherein two parallel inputs and two parallel outputs lead to and from the transmitter section and the receiver section, respectively.

14. The multiplexer of claim 13, wherein the predetermined pattern is at least three unchanged levels in the input storage register and a central one of said at least three bits is inverted by the marker gating means.

15. The multiplexer of claim 3, wherein the sampling rate is eight times the bit rate.

16. The multiplexer of claim 7, further comprising a flip flop and gating connected to the bit register for detecting said predetermined pattern.

17. The multiplexer of claim 7, wherein said comparator means includes gating connected to detect said predetermined pattern in the levels passing through said at least one channel.

* * * * *